Nov. 17, 1959　　　C. D. BERGER　　　2,912,957
INTERPOLATING INDICATORS
Filed June 8, 1956　　　　　　3 Sheets-Sheet 1

INVENTOR
CHRISTIAN D. BERGER

BY Ralph B. Stewart
ATTORNEY

Nov. 17, 1959
C. D. BERGER
2,912,957
INTERPOLATING INDICATORS
Filed June 8, 1956
3 Sheets-Sheet 2
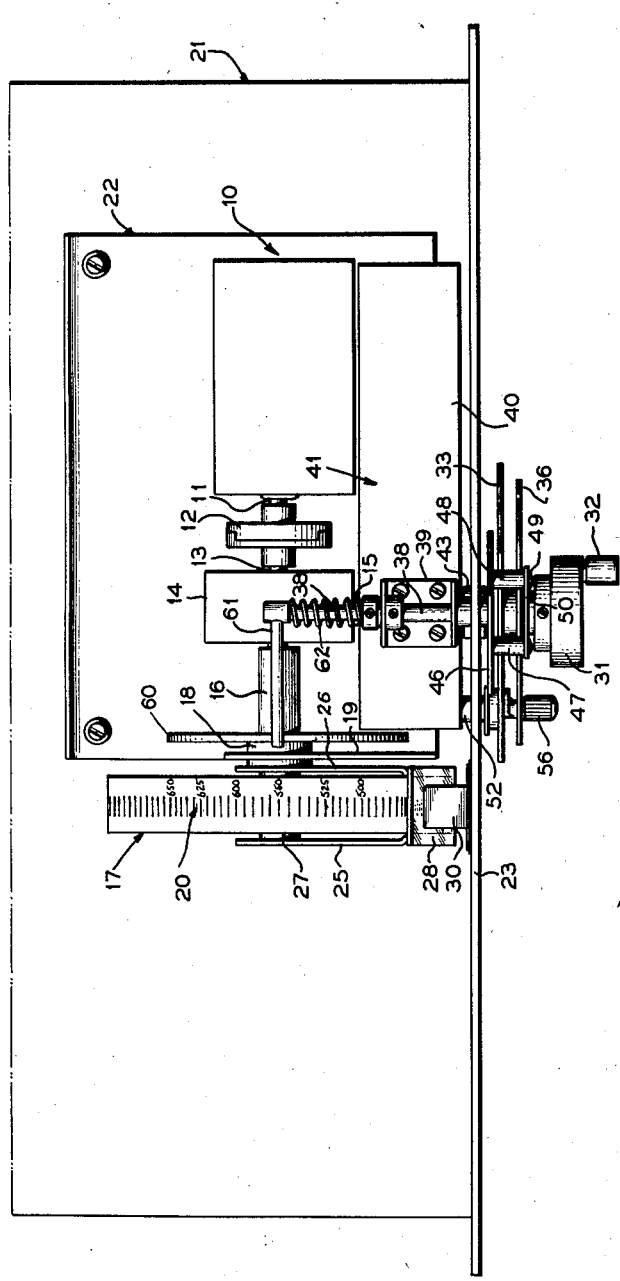
INVENTOR
CHRISTIAN D. BERGER
BY Ralph B. Stewart
ATTORNEY

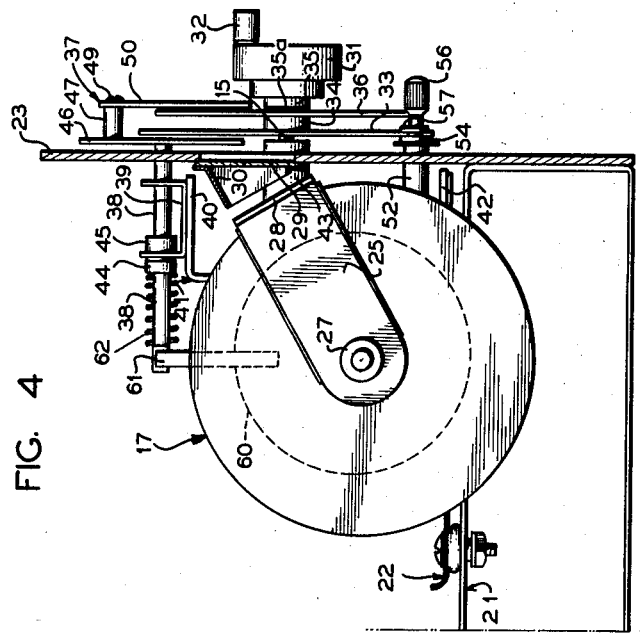

United States Patent Office 2,912,957
Patented Nov. 17, 1959

2,912,957

INTERPOLATING INDICATORS

Christian D. Berger, New York, N.Y., assignor to Polytechnic Research & Development Co., Inc., Brooklyn, N.Y., a corporation of New York Application June 8, 1956, Serial No. 590,168

13 Claims. (Cl. 116—124.1)

This invention relates to indicator devices of the type provided with a coarse indicator scale covering a wide range of values, and a fine or vernier scale for interpolating the values within incremental portions of said wide range.

The invention is particularly adapted for use with instrumentalities having nonlinear adjustment characteristics.

An object of the invention is to provide a single interpolating scale of fixed length which can be used for interpolating the values within incremental portions of the coarse scale of varying length.

A further object of the invention is to provide an indicator device having a movable element for coarse indication over a wide range and a second movable element for small-range interpolating indication, with a driving connection for driving the two movable elements in fixed drive ratio, and including a friction coupling in said driving connection, whereby the movable element of the interpolating indicator may be moved without movement of the wide-range movable element.

Another object of this invention is to provide a measuring or indicating device particularly suited for use in connection with the tuning of the local oscillator of a heterodyne frequency meter which has a nonlinear tuning curve and which is provided with a crystal controlled frequency checking oscillator, wherein a single interpolating scale is rendered capable of interpolating frequencies between any two adjacent frequency check points regardless of the aforementioned nonlinear tuning characteristics.

A further object is to provide a device as set forth in the preceding object wherein a rough indicating dial is utilized to indicate approximately the various frequencies of the crystal check points while a single fine scale dial, driven in fixed drive ratio with the rough dial, is utilized to interpolate between all of the adjacent frequency check points.

In the preferred form of my invention, the interpolating or fine scale is in the form of a spiral scale on a circular dial plate, that is, it is formed of a spiral line on the face of the plate and the line has graduation marks formed thereon at equal angular intervals about the rotary axis of the plate. The index line for reading the spiral scale is formed on an element which pivots about an axis spaced from the dial axis, whereby the index line may be moved to various angular positions with respect to the radial line of the dial passing through the pivot axis of the index line.

The basic principle on which the invention operates is that equal differences in readings on the spiral dial will require different amounts of dial rotation if the index line is tilted to a different angle; that is, if readings are first taken with a radial index line, and then the same readings are taken with an index line that has been tilted to a non-radial position, the amount of dial rotation required to get the same readings originally taken will be different, either more or less, depending on the direction of tilt.

The technique of tilting the index has the same effect that would result from extending or compressing the scale length, and thus makes it possible for the same scale to be used for calibration curve portions having different slopes.

The greater the angle to which the dial index is tilted, the greater will be the change in the amount of rotation corresponding to the dial graduations, that is, the greater will be the angular compression or extension of the dial scale.

Another feature of my invention is to provide an arrangement for automatically tilting the index line to different angular positions throughout the range of the coarse dial.

One embodiment of the invention is illustrated in the accompanying drawing in which:

Figure 2 is a top plan view of the instrument;

Figure 4 is a vertical section as indicated by section line 4—4 in Figure 1;

Figures 5–7 are views showing the fine scale in various positions of adjustment; and Figures 8 and 9 are diagrams showing the preferred manner in which the fine scale is laid out.

Figures 1, 3:
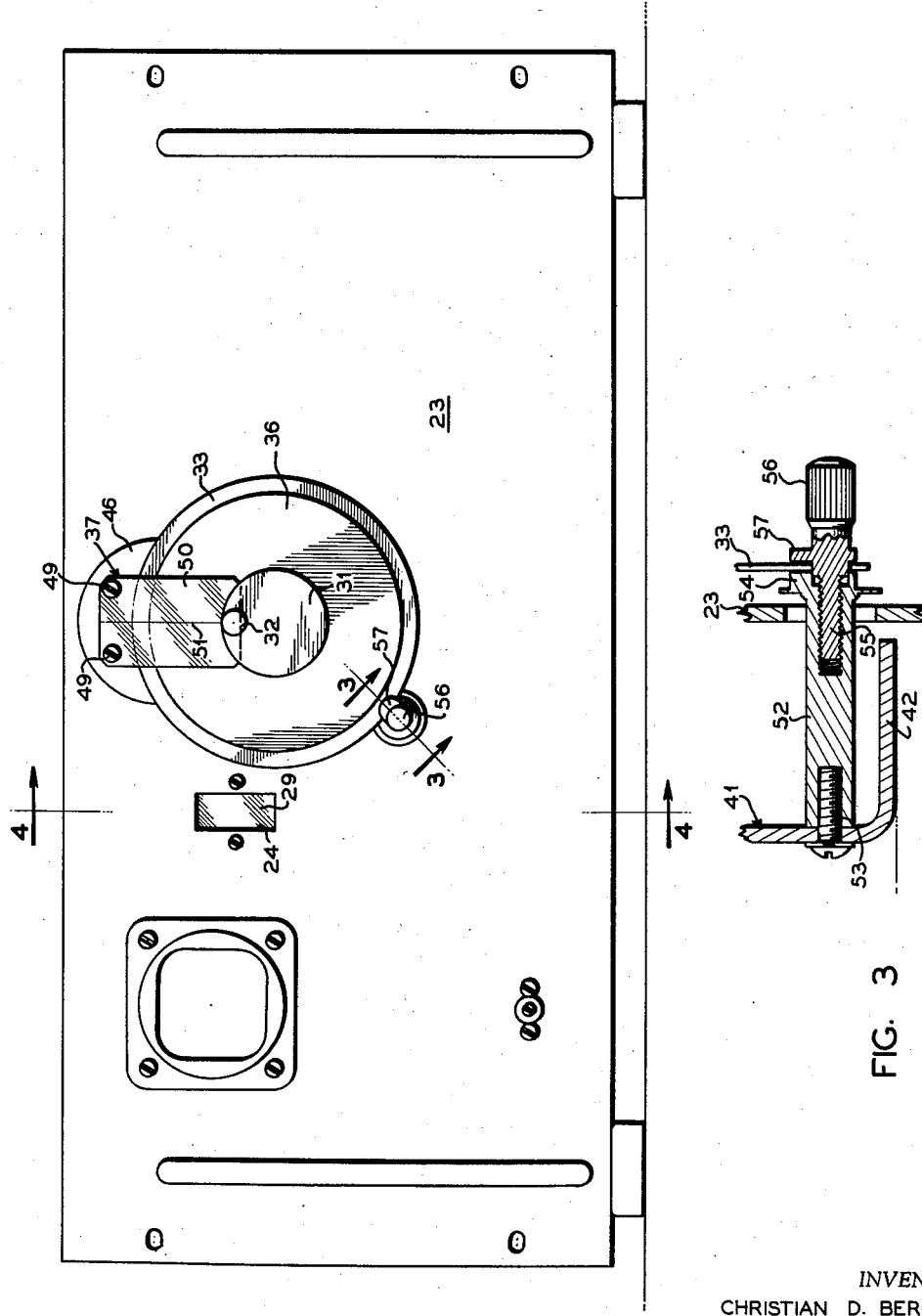
Figure 1 is a front elevational view showing an instrument constructed in accordance with this invention.
Figure 3 is an enlarged sectional view taken along section line 3—3 in Figure 1 and illustrating the details of the tuning lock mechanism.

Referring to Figures 1, 2 and 4, the specific embodiment shown in the drawings illustrates a portion of the chassis of a heterodyne frequency meter in which the tuning device for controlling the frequency of a local oscillator is indicated by reference character 10. The tuning device includes a movable frequency-determining element which is varied by rotating the shaft 11, such as a variable condenser or a variable inductance in a tunable circuit, or a movable plunger in a cavity resonator. Shaft 11 is coupled through the flexible drive coupling 12 to shaft 13 which projects completely through gear box 14 and carries a worm wheel in mesh with a worm carried by shaft 15, the worm wheel and worm both being housed within the gear box and having a drive ratio such that the shaft 15 must be rotated many times to effect one revolution of the shaft 13.

Shaft 13 is fixed rigidly with the hub extension 16 of coarse tuning dial 17 of the drum type. The hub is journalled in the bushing 18 carried by the upstanding member 19 and the dial itself is provided with the coarse tuning scale 20 on its circumferential face. It is to be understood that the coarse scale 20 is nonlinear to approximate the nonlinearity of the tuner and that the coarse scale serves only to apprise the operator as to the approximate frequency setting.

The coarse scale is plotted in the manner dictated by the value of the frequency spacing between the harmonics of the frequency check crystal employed in the instrument. For example, as will become apparent in due course, the particular instrument illustrated is to employ a 5 megacycle frequency spacing between the harmonics of a frequency checking oscillator, and adjacent markings on the coarse scale represent a frequency span of 5 megacycles. These markings will not be uniformly spaced because of the nonlinear character of the frequency-determining element in the tuner 10. The spacing between adjacent graduation marks will change progressively in going from one end of the scale to the other.

Reference character 21 indicates the entire chassis in general, the various component parts of the meter not being shown since they do not, in themselves, form a part of this invention. A subchassis 22 may be used for mounting certain components such as the tuning device 10 and the indicating mechanism of the invention. Also, a vertical front plate 23 is fixed to the chassis 21 having a window opening 24, see Figure 1, through which the coarse dial is viewed. A pair of arms 25 and 26 straddle the coarse dial 17 with one of such arms 26 being fixed to the bushing 18 while the other is guided upon the coarse dial hub portion 27. The arms are held fixed and carry a transparent index plate 28 provided with a horizontal index line so that a viewer may observe the approximate frequency setting. The window 29 on front plate 23 may have a shroud or visor 30 surrounding the window at the back of plate 23 for shielding the reading from stray light sources, see Figures 2 and 4.

The previously mentioned shaft 15 extends from the gear box 14, through the front plate 23 and has a tuning knob 31 fixed to its free end. The tuning knob is manipulated by means of the crank pin or handle 32 mounted on its outer face. Rigidly fixed to shaft 15 is a lock disk 33 carried by a hub or collar 34 which is rigidly secured to shaft 15, as for example by a setscrew. Sandwiched between collar 34 and another collar 35 fixed to shaft 15, is the fine tuning dial 36 which is only frictionally coupled to the shaft and may be turned with respect thereto as will presently appear. To achieve this frictional relationship, any form of simple clutch may be employed. A preferred method is to use a compressible washer 35a interposed between one or both of the collars 34 and 35 and the fine scale disk.

The indexing means for the fine scale is indicated generally by reference character 37 and includes the pivot shaft 38 carried by a U-shaped bracket 39 fixed to the upper leg 40 of a channel member 41 which, in turn, has its lower leg 42 fixed to the subchassis plate 22 so that the channel web is in a vertical plane, see Figure 4. A bearing sleeve 43 for supporting shaft 15 may be carried between the channel web and front plate 23.

The pivot shaft 38 is axially fixed with respect to bracket 39 and in light frictional engagement with one upstanding leg thereof by means of a pair of collars 44 and 45 which sandwich such leg. The outer end of the pivot shaft carries a mounting member, in this case, a disk 46 which is staked to the end of the pivot shaft. The mounting disk carries a pair of horizontal posts 47 and 48 which are threaded to receive screws 49 holding the transparent index window plate 50 in place, see Figure 4. Index plate 50 is provided with an index line 51 marked or scored thereon. In the specific example illustrated, the index line is formed to intersect the axis line of pivot shaft 38 for a purpose to be presently disclosed. While this is the preferred arrangement, the pivot axis for the index line may be located closer to or further away from the dial axis.

A locking device is provided for holding a desired adjustment of the tuning control shaft 15, such as that illustrated in Figure 3. This mechanism takes the form of a horizontal post 52 fixed at one end to the web of channel 41 by screw 53 and projecting through front plate 23 to terminate in an enlarged portion 54 extending behind a marginal edge portion of the locking disk 33. The free end of post 52 is internally threaded to receive the threaded stem 55 of locking knob 56 having an enlarged portion 57 extending in front of the same edge portion of the locking disk so that when the locking knob is screwed in, the two portions 54 and 57 will nip the edge portion and hold disk 33 in locked position.

The frequency meter with which the specific form of indicator may be used is of the type having a variable frequency local oscillator against which the unknown frequency signal is heterodyned and a suitable beat frequency indicator for determining the unknown frequency. Additionally, the meter includes a local frequency check oscillator of the crystal type (a harmonic generator) which is used to set the index line 51 at the proper angle with respect to the fine scale on dial 36. Preferably, the fine scale is in the form of graduations marked on a spiral line 36a as is shown in Figures 5–7. The index line 51 and the fine scale line 36a must be so related that the visual angle of intersection between them varies as the fine scale is moved past the index line. So long as this relationship exists, a variation in the angle of intersection between the index line and the fine scale line as effected by movement of the indexing means will compress or extend the effective length of the fine scale so that if the correct position of the index line is attained, the fine scale will interpolate the readings within its range.

Additionally, the zero point of the fine scale is radially offset from the axis of the fine scale disk, and in the preferred form it is offset by the same amount as the axis of index pivot shaft 38 is offset from the same axis. The purpose of this will be presently apparent.

In use of the frequency meter as above described, the frequency of the local oscillator is varied by turning the tuning knob 31 which simultaneously adjusts the tuning device 10 and rotates the coarse dial, the coarse scale being calibrated to the meter. The tuning is adjusted to the point at which a zero beat is produced between the local and unknown frequencies. At this point, the fine scale line might be in any position such as that shown in Figure 6, with the index line 51 as diagrammatically illustrated in this figure, probably being in the same position to which it was adjusted for the last reading taken. The 5 megacycle crystal oscillator is now switched in and the knob 31 turned to the point in which the local oscillator is in zero beat with the next lowest harmonic of the crystal oscillator. The locking device is now manipulated to hold the adjustment of the tuning mechanism and the fine scale dial or disk is rotated against the friction elements which normally cause it to rotate with shaft 15 until the zero point of the fine scale line 36a is directly under the index line 51, as indicated in Figure 5. Since, as was previously described, the index line intersects the axis of rotation of the index pivot shaft 38 and the zero point of the fine scale line 36a is radially offset from its axis of rotation a distance corresponding to the distance between the axes of shafts 15 and 38, with the parts as shown in Figure 5, the zero point of the fine scale line is directly under the point M on the index line, which point marks the pivot axis of the index line. This point does not move regardless of the angularity of the index line.

The next step is to release the locking device and turn the tuning adjustment until the next highest harmonic of the crystal oscillator is in zero beat with the local oscillator. At this point, the index plate 50 is moved so that the index line 51 intersects the inner end of the fine scale line 36a, as shown in Figure 7. Of course, the correct frequencies of the two crystal check points are known by referring to the coarse scale, and the unknown frequency will be bracketed between these two check frequencies. Therefore, when the meter is tuned back to zero beat with the unknown frequency, the direct fine scale reading is added to the frequency of the lower crystal check frequency to determine the frequency being measured.

From the above, it will be apparent that the lower crystal check point is employed to obtain the correct position of the fine scale in relation to the tuning shaft, whereas the higher check point is used to obtain the correct setting or angularity of the index line.

In the operation described above, it has been assumed that the index plate 50 was adjusted manually to the proper angle position for each frequency measurement, but this manual operation may be eliminated by adjusting the index plate automatically in accordance with the position of the tuner. This is accomplished by providing a suitable cam 60 mounted to turn with the tuner shaft 11, such as by mounting the cam upon the sleeve 16 in the manner shown in Figure 2. The index plate is shifted to different angles by an arrangement including an arm 61 extending from the rear end of shaft 38 into contact with the peripheral edge of the cam 60. A spring 62 on shaft 38 keeps the arm 61 in contact with the edge of cam 60. By properly shaping the peripheral edge of the cam 60, the index plate 50 will be moved to the correct angular position for frequency measurements throughout the range of the tuner. As already noted, the index plate may be adjusted manually, if desired.

As shown in Figures 5–7, two fine scales 36a and 36b may be used to cover different portions of the tuning range, both originating at the same zero point M. For example, in a meter having a frequency range of 500 mc. to 950 mc., scale 36a might cover the range of 500 to 545 mc. while scale 36b would cover the range of 540 to 950 mc. The two scales may be printed in different colors, and the corresponding portions of the coarse dial would be printed in the same colors. The reason for using two scales is to cover a wide tuning range without having to resort to abnormal angular settings of the index line. It is preferred to keep the angular displacement of the index line within about 30°.

The particular form of spiral scale employed is a matter of some importance. It must be pointed out that the effect of compressing or extending the dial scale obtained by tilting the index line is not uniform for all parts of the scale, and inaccuracies in reading will result. The amount of such inaccuracy or geometric error that will result must, therefore, be calculated to determine if it is tolerable for the curve in question.

If the dial scale is in the form of a spiral of Archimedes the angular error will be:

$$\epsilon = \phi a(1-k)\left(\frac{1}{r+ka} - \frac{1}{r}\right) \text{ approx. for small angles of } \phi$$

where $\epsilon$ = angular error of dial scale position at a given graduation
$\phi$ = angle between index line and a radial line intersecting the index line at radius $r+a$
$r$ = radius of spiral at innermost graduation
$a$ = difference between radii of spiral at innermost and outermost graduations
$k$ = the fraction between 0 and 1 such that $r+ka$ equals radius of spiral at graduation being considered.

As can be seen the error increases directly with the tilt angle $\phi$ for small angles of $\phi$. This means that the amount of compression or extension in scale length, for a given degree of precision is limited. The error increases more rapidly for larger angles of $\phi$.

For example, if $\phi = 5\frac{1}{2}°$, $r=1$, $a=.4$ and $k=.5$ an error of 0.18° will occur at the mid scale point, when the dial is extended or compressed about 2.2°.

This means that great changes in effective scale length to allow for great changes in slope of the instrument calibration curve cannot be obtained using the spiral of Archimedes without involving relatively large errors in reading.

My invention involves the use of a special spiral curve which greatly overcomes this problem.

The method by which the preferred scale is formed is illustrated in Figures 8 and 9.

Referring to Figure 8, a vertical line OA is drawn from center O and of the length $\rho$ equal to the radius of the outer end of the scale ($\rho = r+a$). Through the point A a second line AB is drawn at an angle $\phi$ which is the maximum angle of the index line with respect to the radius between the dial center and the center of turning of the index line. In the example given, this angle $\phi$ may be 30°. From the center O a third line OB is drawn having a radius $r$ equal to the radius of the inner end of the spiral scale. The angle between the lines OA and OB is divided into a number of equal angles, and radial lines are drawn to intersect the line AB at varying distances from the center O.

In rectangular coordinates, the line AB is represented by the equation $y = mx + b$, which can be written $$y = (\cot \phi)x + \rho_A$$

where $\rho_A$ is the radius of the point A from the center O.

The above equation for line AB may be converted into polar coordinates by substituting the values $$y = \rho \sin \theta$$
$$x = \rho \cos \theta$$

which results in the equation $$\rho \sin \theta = \rho \cot \phi \cos \theta + \rho_A$$

or $$\rho = \frac{\rho_A}{\sin \theta - \cot \phi \cos \theta}$$

which is polar equation of line AB. Now, the spiral is related to the straight line AB in such manner that:

$$\rho' = \rho$$
$$\theta' = c\theta$$

where $c$ is an arbitrary constant and $\rho'$, $\theta'$ are the coordinates of the spiral.

The equation of the spiral then is:

$$\rho' = \frac{\rho_A}{\sin\left(\frac{\theta'}{c}\right) - \cot \phi \cos\left(\frac{\theta'}{c}\right)}$$

$c$ can be evaluated from $$c = \frac{\theta'_B - \theta'_A}{\theta_B - \theta_A}$$

and that only portion of spiral that is used is for values of $\theta'$ between $\theta'_A$ and $\theta'_B$.

As shown in Figure 9, this spiral is plotted by plotting the radius values of Figure 8 on equally spaced radial lines drawn about the center of the dial over an angle $\theta'_B - \theta'_A$, and a smooth curve is drawn between the radius values to produce the spiral curve.

This spiral increases in radius at an increasing rate in contrast to the constant rate of the Archimedes spiral.

The angular error resulting from the use of this spiral is evaluated to be:

$$\epsilon = \Delta\left[\frac{B}{\Delta} - \frac{\alpha}{\omega}\right]$$

where $$\Delta = \sin^{-1}\left[\left(\frac{r+a}{r}\right) \sin \phi\right] - \phi$$

$$\beta = \sin^{-1}\left[\left(\frac{r+a}{r+ka}\right) \sin \phi\right] - \phi$$

$$\alpha = \sin^{-1}\left[\left(\frac{r+a}{r+ka}\right) \sin \phi_0\right] - \phi_0$$

$$\omega = \sin^{-1}\left[\left(\frac{r+a}{r}\right) \sin \phi_0\right] - \phi_0$$

As an example: if $\phi_0 = 30°$, $\phi = 10°$, and $r$, $k$, and $a$ have the same values used in the other example, an error of only .07° will occur (near mid scale) and the dial scale can be compressed or extended about 14.5°.

It should be noted that no error exists with this spiral when the index is tilted to the angle $\phi_0$ as well as when it is in a radial position ($\phi = 0$). For the Archimedes spiral only the radial index position gives no error.

Although this invention has been described in conjunction with a frequency meter, it is to be understood that the invention in its broader aspect relates to the problem of interpolation in conjunction with an instrumentality having nonlinear adjustment characteristics.

I claim:

1. In an indicator device, the combination of a wide-range indicator having a relatively movable index member and scale, said scale being graduated in marks of progressively increasing spacing, and a small-range indicator having spaced graduation marks thereon interpolating the values between adjacent marks on said wide-range indicator, and means embodied in said small-range indicator operative to vary the effective length of the interpolating scale in accordance with the relative position of the index member along the scale of the wide-range indicator to accommodate the different spacings of the marks on said wide-range indicator scale.

2. An indicator device according to claim 1 wherein said small-range indicator scale is varied in effective length by means shifting the angular position between the scale and an intersecting index line.

3. An indicator device according to claim 1 and including means controlled by movement of the moving element of said wide-range indicator for operating said first-named means.

4. In an indicating device, a coarse non-linear movable scale, an indicating member movable with the scale having a face provided with a curved, graduated fine scale having a range representing increments of the coarse scale, adjustable index means visually presenting an index reference line across at least a portion of said face visually intersecting different points on the fine scale as said indicating member is moved anywhere within the range of adjustment of the coarse scale, and means to adjust the index means to vary the angle of intersection between said reference line and the fine scale, independently of movement of said indicating member.

5. In an indicating device, a coarse indicating member for establishing graduation points representing between adjacent index points increments within the range of a non-linearly adjustable instrument, a fine indicating member rotatable in response to the adjustment of the instrument and having a face provided with a graduated fine scale having a range for measuring between any two adjacent graduation points of the coarse scale, an indexing mechanism visually presenting an index reference line across at least a portion of said face and visually intersecting different points of the fine scale as said member is rotated, and means varying the visual angularity between said reference line and the fine scale to compress or extend the effective length of the fine scale.

6. In an indicating device for instrumentalities having non-linear characteristics, a coarse indicating member establishing graduation points representing increments within the range of a non-linearly adjustable instrument, an indicating member rotatable in response to adjustment of the instrument and having a face provided with a graduated fine scale having a range for measuring between any two adjacent graduation points of the coarse scale, a rotatably mounted indexing mechanism visually presenting an index reference line across at least a portion of said face visually intersecting different points on the fine scale as said fine indicating member is rotated, and means to rotate said mechanism about an axis substantially parallel to the axis of rotation of said fine indicating member to vary the angularity between said reference line and the fine scale, the axis of rotation of said mechanism being radially offset from the axis of rotation of said fine indicating member by an amount equal to the radial offset of one end of said fine scale from the axis of rotation of said fine indicating member.

7. In combination, a shaft rotatable in accordance with a condition to be measured, coarse indicating means rotatable with the shaft and having a non-linear coarse scale, a second shaft coupled to said first shaft and rotatable therewith in fixed speed relation, a fine indicating member mounted on said second shaft and rotatably mounted thereon, means on said second shaft frictionally engaging said member to normally rotate the member therewith, said member having a face provided with a graduated fine scale of a range representing increments within the range of the coarse scale, an adjustable indexing mechanism presenting an index reference line extending across at least a portion of said face visually intersecting different points of the fine scale as the member is rotated, and means to adjust the indexing mechanism to vary the angle of intersection between the index line and the fine scale to compress or extend the effective length of the latter.

8. In combination, a nonlinearly variable instrumentality including a rotatable part, an operating shaft fixed to said rotatable part, a coarse indicating dial rigid with said shaft and having a nonlinear coarse scale thereon graduated in values extending over the range of the instrumentality, means including a second shaft driving said first shaft through a speed reducing connection, a fine indicating dial frictionally mounted on said second shaft to normally rotate therewith and having a graduated fine scale thereon representing intermediate values between adjacent values on the coarse scale, an adjustable indexing mechanism presenting an indexing reference line extending across the face of said fine indicating dial to visually intersect different points on the fine scale as said fine indicating dial is rotated, and means to adjust the indexing mechanism to vary the angle of intersection between the indexing line and the fine scale, independently of rotation of said shaft means, to compress or extend the effective length of said fine scale and accommodate for the nonlinearity of the instrumentality within the different portions of its range.

9. In combination, a shaft rotatable in accordance with a nonlinearly variable condition to be measured, a coarse indicating dial coupled with said shaft and rotatable therewith in fixed speed relation and having a coarse scale thereon graduated in values representing the range of measurement, a fine indicating dial having a fine scale on its face graduated in intermediate values spanning the range between adjacent values on the coarse scale, yieldable means mounting said fine indicating dial on the shaft means and rotatable therewith, a rotatably mounted index means presenting a visual index line extending across at least a portion of the face of said fine indicating dial and intersecting said fine scale, and means to rotate said index means to vary the angularity of said index line with respect to said fine scale to compress or extend the effective length of the latter in conformity with the particular portion of the range being measured, said yieldable means permitting rotation of said fine indicating dial on the shaft to properly relate the index line and the fine scale.

10. In combination, a shaft rotatable in accordance with a measurable condition, a dial rotatable with said shaft and having a face provided with a spiral scale, indexing means mounted to turn about an axis parallel to but radially offset from the axis of said shaft, said indexing means presenting an index line extending across said dial face to visually intersect said scale and extending radially from the axis of rotation of the index means, the scale having one end thereof radially offset from the axis of said shaft by an amount corresponding to the radial offset of the axis of rotation of said indexing means.

11. In combination, a disk-type dial mounted to rotate about its center and having a spiral scale formed on one face thereof, indexing means providing an index line mounted in front of said scale and visually intersecting said scale, and means mounting said indexing means to adjust the angular position of said index line about an axis displaced from the axis of said dial.

12. A combination according to claim 11 wherein the radius $\rho'$ of said spiral at an angle $\theta'$ with respect to a reference radius conforms with the polar coordinate equation:

$$\rho^1 = \frac{\rho_A}{\sin\left(\frac{\theta'}{c}\right) - \cot\phi_0 \cos\left(\frac{\theta'}{c}\right)}$$

where $\rho_A$ is the maximum radius of the scale, $c$ is a constant, and $\phi_0$ is the maximum angular displacement of the index line from its zero position.

13. A disk-type dial having a spiral scale formed on one face thereof, the radius $\rho'$ of the scale varying with the angle $\theta'$, as measured about the axis of the dial from a reference radius, according to the equation:

$$\rho' = \frac{\rho_A}{\sin\left(\frac{\theta'}{c}\right) - \cot\phi_0 \cos\left(\frac{\theta'}{c}\right)}$$

where $\rho'_A$ is the maximum radius of the scale, $c$ is a constant, and $\phi_0$ is the maximum angular displacement of the index line from its zero position.

References Cited in the file of this patent

UNITED STATES PATENTS

| | | |
|---|---|---|
| 1,760,291 | Thomas | May 27, 1930 |
| 1,971,238 | Silling | Aug. 21, 1934 |
| 2,001,565 | Berejkoff | May 14, 1935 |
| 2,091,109 | Shiepe | Aug. 24, 1937 |
| 2,552,828 | Westover | May 15, 1951 |